US011160218B2

(12) United States Patent
Hunter

(10) Patent No.: US 11,160,218 B2
(45) Date of Patent: Nov. 2, 2021

(54) INDOOR GARDEN CENTER WITH ROTATING COMPARTMENTS AND ENVIRONMENTAL CONTROL

(71) Applicant: Haier US Appliance Solutions, Inc., Wilmington, DE (US)

(72) Inventor: Matthew Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 231 days.

(21) Appl. No.: 16/406,212

(22) Filed: May 8, 2019

(65) Prior Publication Data
US 2020/0352112 A1 Nov. 12, 2020

(51) Int. Cl.
*A01G 9/24* (2006.01)
*A01G 9/02* (2018.01)
*A01G 31/02* (2006.01)

(52) U.S. Cl.
CPC .............. *A01G 9/24* (2013.01); *A01G 9/022* (2013.01); *A01G 9/028* (2013.01); *A01G 31/02* (2013.01)

(58) Field of Classification Search
CPC ... A01G 9/24; A01G 9/18; A01G 9/14; A01G 9/1469; A01G 31/02; A01G 31/06; A01G 31/00; A47F 3/00; A47F 3/001; A47F 3/02; A47F 3/04; A47F 3/10; A47F 3/085; A47F 5/02; A47F 3/11; A47B 49/00; A47B 49/004; F25D 25/027
See application file for complete search history.

(56) References Cited

U.S. PATENT DOCUMENTS

| | | | | |
|---|---|---|---|---|
| 5,549,373 | A * | 8/1996 | Bustos | A47F 3/0408 312/125 |
| 6,585,119 | B2 * | 7/2003 | Palder | A47F 5/02 211/163 |
| 8,511,487 | B2 * | 8/2013 | Andersen | A47F 1/12 211/144 |
| 8,984,806 | B2 | 3/2015 | Uchiyama | |
| 9,198,511 | B2 * | 12/2015 | Pendleton | A47B 49/004 |
| 9,974,243 | B2 * | 5/2018 | Martin | A01G 31/06 |
| 10,631,667 | B2 * | 4/2020 | Wright | A47F 7/00 |
| 2010/0176074 | A1 * | 7/2010 | Andersen | A47F 5/0087 211/59.2 |
| 2016/0212954 | A1 * | 7/2016 | Argento | A01G 31/02 |
| 2019/0069693 | A1 * | 3/2019 | Godbole | A47F 3/0439 |

(Continued)

FOREIGN PATENT DOCUMENTS

| | | | | |
|---|---|---|---|---|
| CN | 102499051 B | 12/2013 | | |
| DE | 4411226 C1 * | 8/1995 | | A01C 1/02 |

(Continued)

*Primary Examiner* — Kristen C Hayes
(74) *Attorney, Agent, or Firm* — Dority & Manning, P.A.

(57) ABSTRACT

An indoor gardening appliance includes a liner positioned within a cabinet that defines a front display opening and an enclosed back portion. A grow module is rotatably mounted within the liner and include a central hub and a plurality of partitions defining a plurality of grow chambers. The grow module is selectively rotated to index the plurality of grow chambers between a sealed position between the grow module and the enclosed back portion of the liner and a display position aligned with the front display opening. An environmental control system regulates a temperature within the chamber when the chamber is in the sealed position.

20 Claims, 12 Drawing Sheets

(56) References Cited

U.S. PATENT DOCUMENTS

2019/0150636 A1\* 5/2019 Wright .................. A47F 3/0478
2020/0260665 A1\* 8/2020 Yi ........................ A01G 27/003

FOREIGN PATENT DOCUMENTS

| JP | 2012110285 A | 6/2012 |
| JP | 5808992 B2 | 11/2015 |
| KR | 101878092 B1 | 7/2018 |
| WO | WO2018158093 A1 | 9/2018 |

\* cited by examiner

INDOOR GARDEN CENTER WITH ROTATING COMPARTMENTS AND ENVIRONMENTAL CONTROL

FIELD OF THE INVENTION

The present subject matter relates generally to systems for gardening plants indoors, and more particularly, to systems and methods for operating an indoor garden center providing improved environmental control and visibility.

BACKGROUND OF THE INVENTION

Conventional indoor garden centers include a cabinet defining a single chamber having a number of trays or racks positioned therein to support seedlings or plants, e.g., for growing herbs, vegetables, or other plants in an indoor environment. In addition, such indoor garden centers may include an environmental control system that maintains the growing chamber at a desired temperature or humidity. Certain indoor garden centers may also include artificial lighting systems that provide the light necessary for such plants to grow.

However, conventional indoor garden centers provide little versatility in controlling the chamber environment. In this regard, the desirable environmental conditions are often plant specific and can vary widely. For example, some plants may prefer warmer climates (e.g., above room temperature), while others may prefer cooler climates (e.g., below room temperature). The optimal humidity level, lighting levels, and other growth factors may also vary from plant to plant. Common indoor garden centers cannot compensate for such variation.

Moreover, such centers often provide poor visibility of plants growing therein. In addition, those indoor garden systems which provide improved visibility often generate significant light pollution within the indoor environment. For example, artificial lighting systems may remain on constantly and be very bright and harsh to the user's eyes. In addition, such systems may rely on artificial lighting when natural lighting is otherwise being supplied, e.g., into the room during daylight hours. Therefore, in addition to providing excessive amounts of light at times when it is not desired, such lighting systems often consume large amounts of energy. Moreover, conventional indoor garden centers provide little versatility for accommodating plants that require varying environmental conditions or light levels.

Accordingly, an improved indoor garden center would be useful. More particularly, an indoor garden center with improved plant visibility and access, as well as more versatile environmental control and lighting systems, would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided. The gardening appliance includes a liner positioned within a cabinet, the liner defining a front display opening and a grow module mounted within the liner. The grow module defines a plurality of grow chambers spaced apart along a circumferential direction, the grow module being rotatable to index each of the plurality of grow chambers through a sealed position and a display position, wherein a chamber of the plurality of chambers is in the sealed position when substantially sealed between the grow module and the liner and in the display position when aligned with the front display opening. An environmental control system regulates a temperature within the chamber when the chamber is in the sealed position.

In another exemplary embodiment, a gardening appliance defining a vertical direction is provided. The gardening appliance includes a liner positioned within a cabinet, the liner defining a front display opening and a grow module mounted within the liner. The grow module includes a central hub rotatable about an axis and a plurality of partitions extending from the central hub substantially along a radial direction to define a plurality of grow chambers, wherein the grow module further defines a root chamber within at least one of the central hub or the plurality of partitions. An internal divider splits the root chamber into a plurality of root chambers and an environmental control system regulates a temperature within at least one of the plurality of grow chambers or the plurality of root chambers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
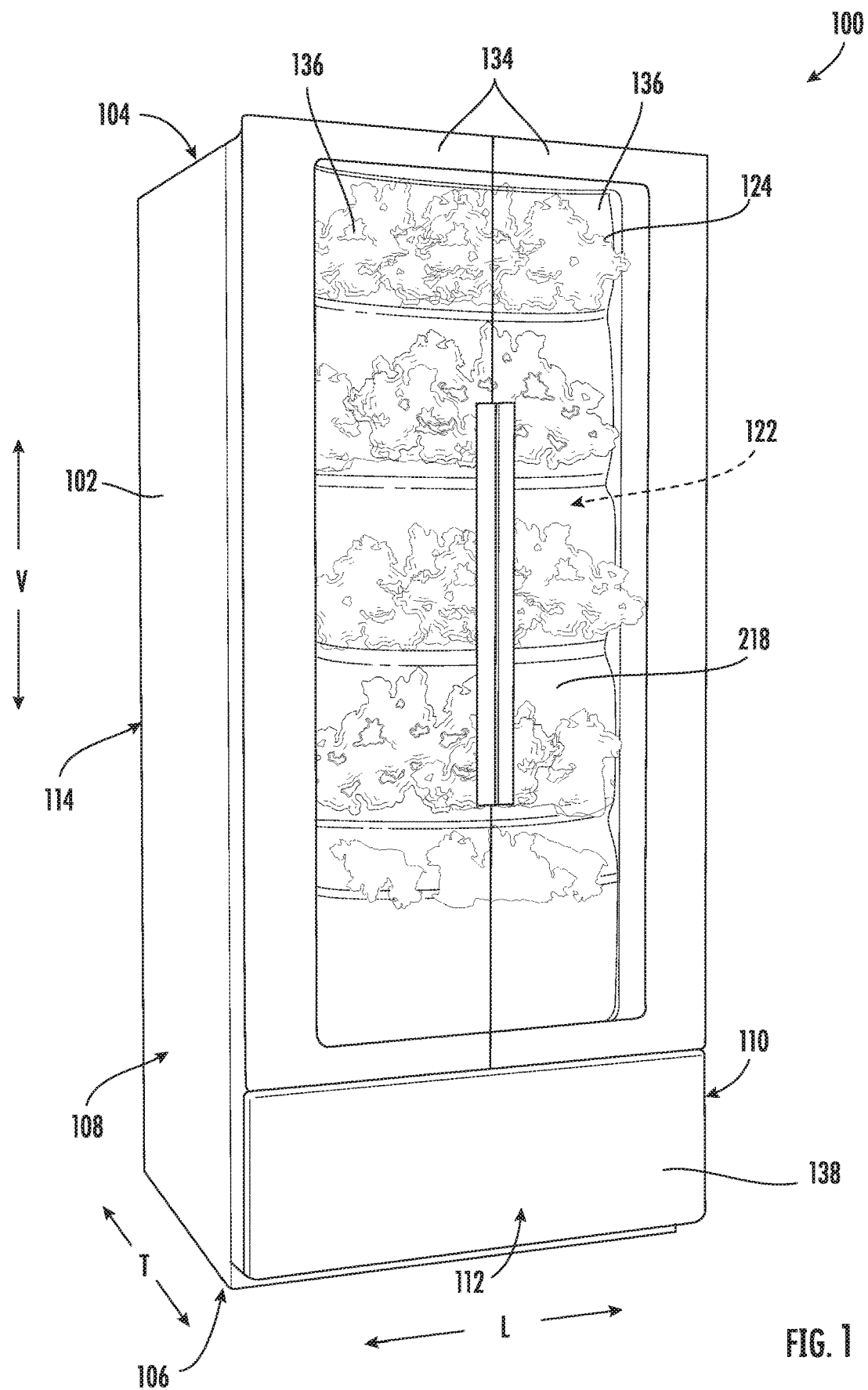
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled chamber 122 within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access temperature controlled chamber 122, e.g., for harvesting, planting, pruning, or otherwise interacting with plants 124. According to an exemplary embodiment, enclosed back portion 130 may be defined as a portion of liner 120 that defines temperature controlled chamber 122 proximate rear side 114 of cabinet 102. In addition, front display opening 132 may generally be positioned proximate or coincide with front side 112 of cabinet 102.

Figure 2:
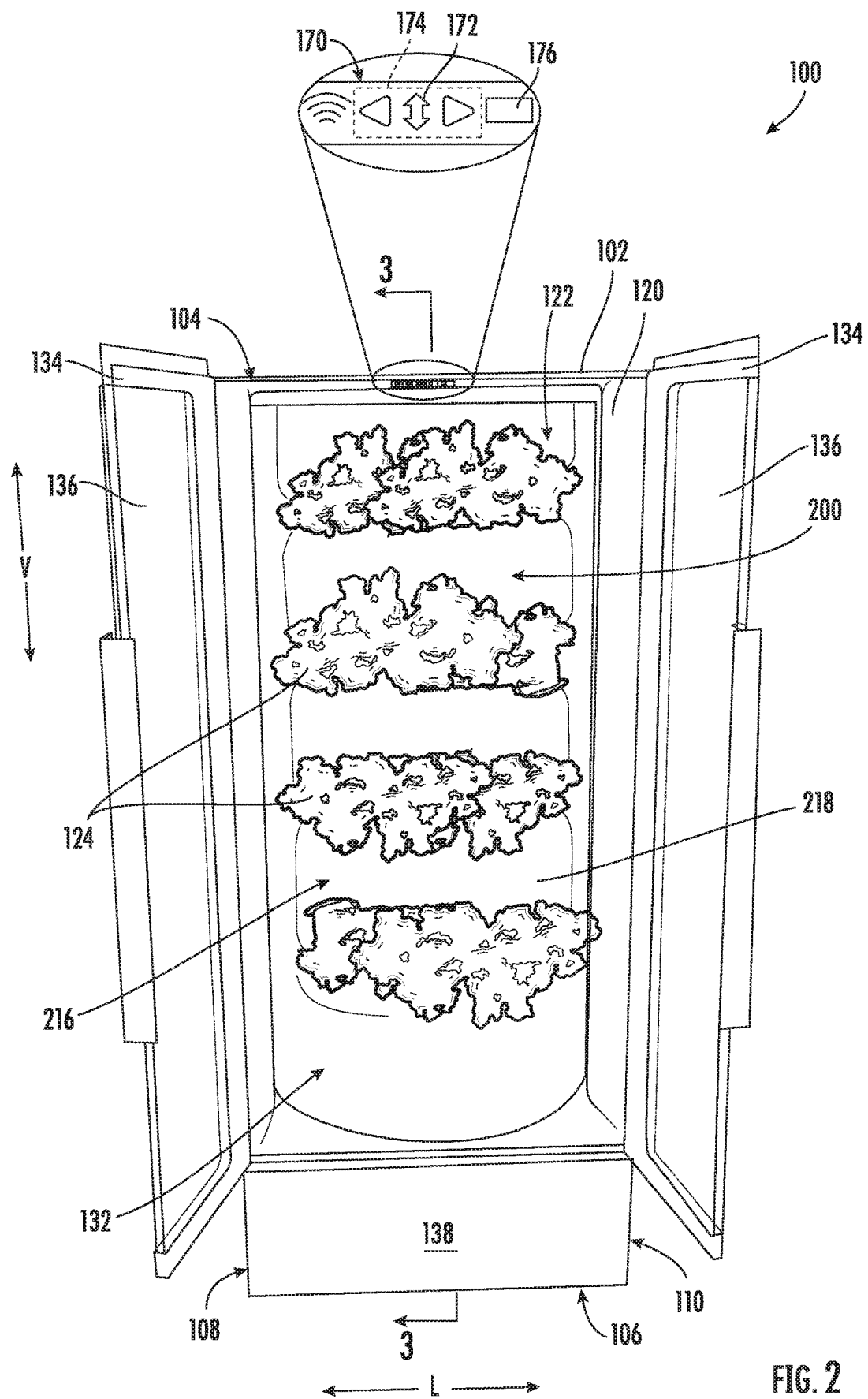
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to temperature controlled chamber 122. For example, FIG. 1 illustrates doors 134 in the closed position such that they may help insulate temperature controlled chamber 122. By contrast, FIG. 2 illustrates doors 134 in the open positioned for accessing temperature controlled chamber 122 and plants 124 stored therein. Doors 134 may further include a transparent window 136 through which a user may observe plants 124 without opening doors 134.

Figure 14:
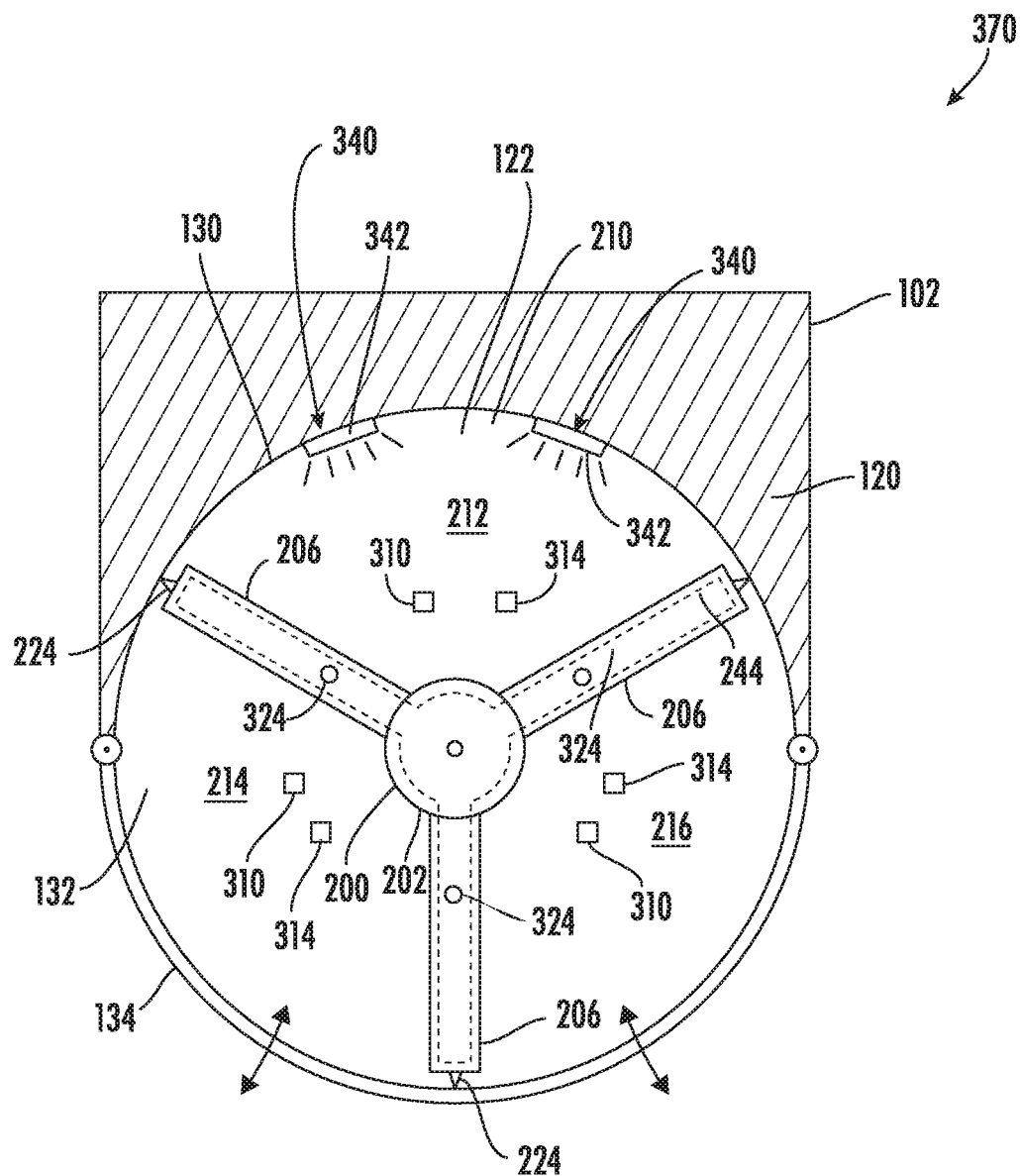
FIG. 14 provides a top schematic view of a gardening appliance according to another exemplary embodiment of the present subject matter.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, as shown in FIG. 14, doors 134 may be curved, may be formed entirely from glass, etc. In addition, doors 134 may have integral features for controlling light passing into and/or out of temperature controlled chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of a sealed cooling system for regulating the temperature within temperature controlled chamber 122, as described in more detail below.

FIGS. 3 through 6 provide schematic views of certain components of an environmental control system 148 that may be used to regulate a temperature within temperature controlled chamber 122. Specifically, environmental control system 148 may include a sealed system 150, a duct system 300, and a hydration system 320, or any other suitable components or subsystems for regulating an environment within temperature controlled chamber 122, e.g., for facilitating improved or regulated growth of plants 124 positioned therein.

Figure 3:
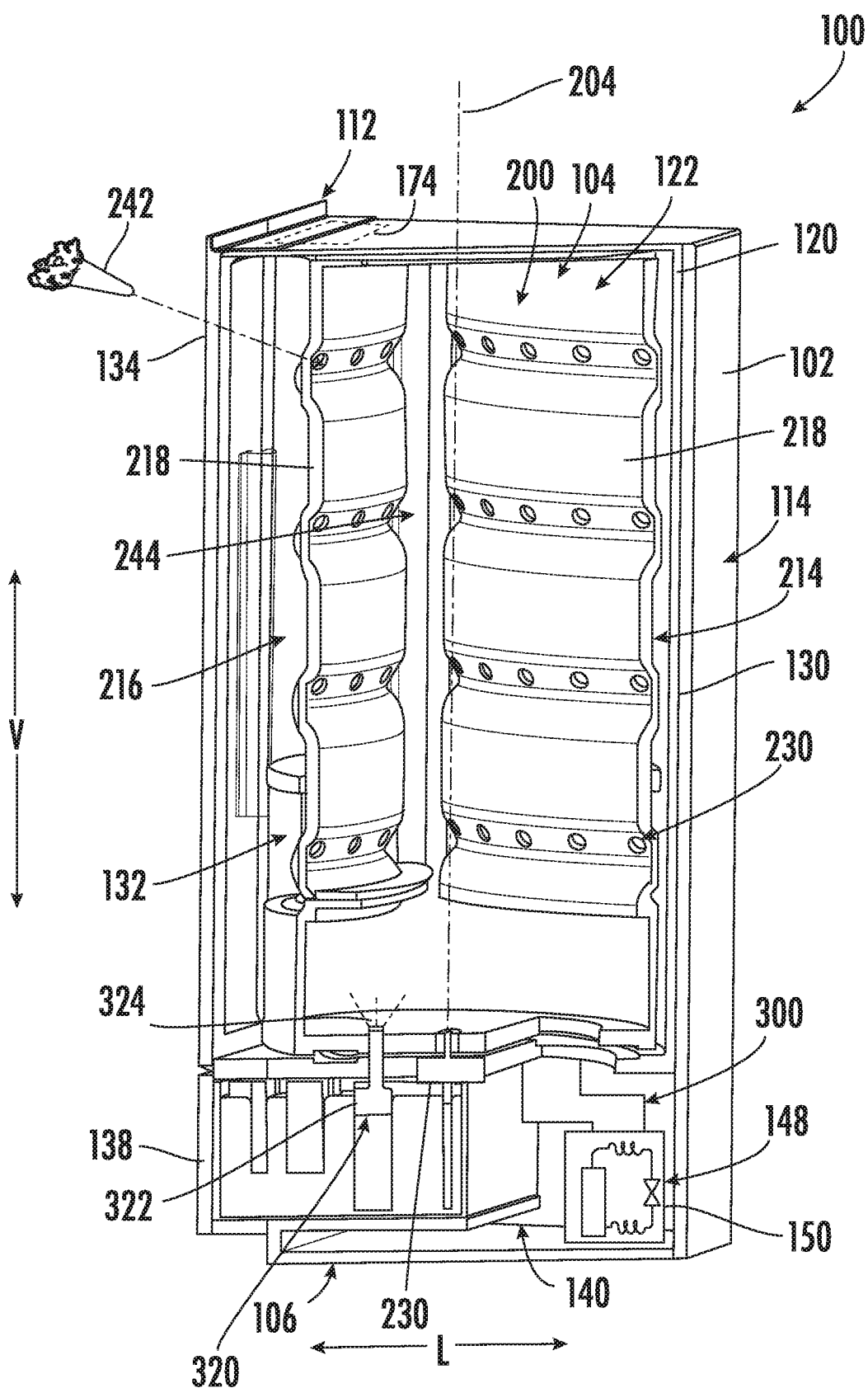
FIG. 3 is a cross sectional view of the exemplary gardening appliance of FIG. 1, taken along Line 3-3 from FIG. 2 with an internal divider removed for clarity.
Figure 4:
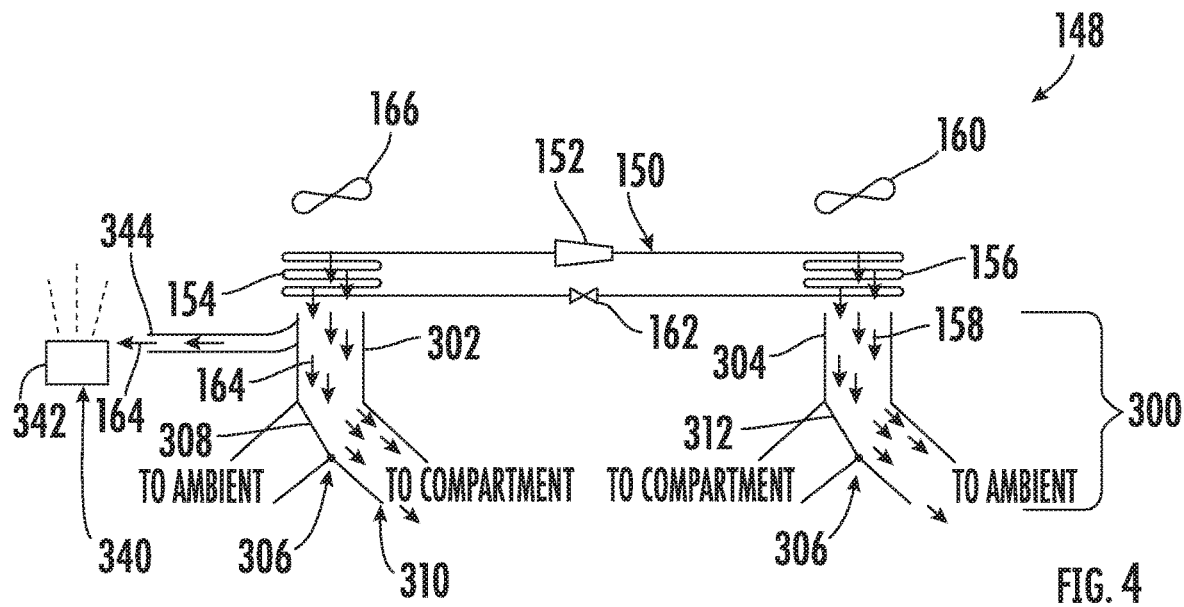
FIG. 4 provides a schematic view of an environmental control system for use with the exemplary gardening appliance of FIG. 1, operating in a cooling mode.
Figure 5:
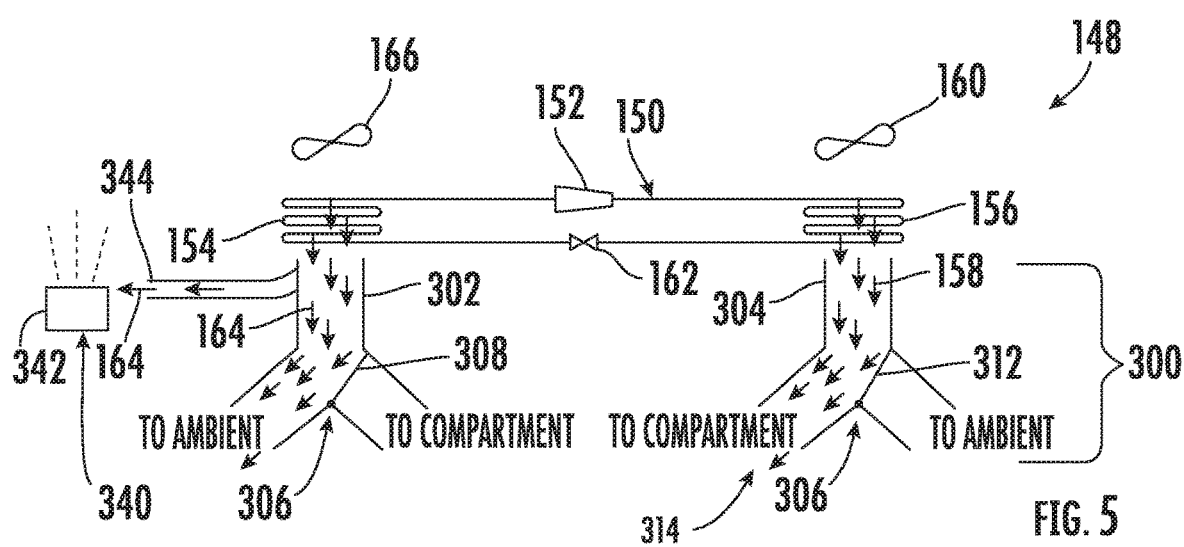
FIG. 5 provides a schematic view of the exemplary environmental control system of FIG. 4, operating in a heating mode.
Figure 6:
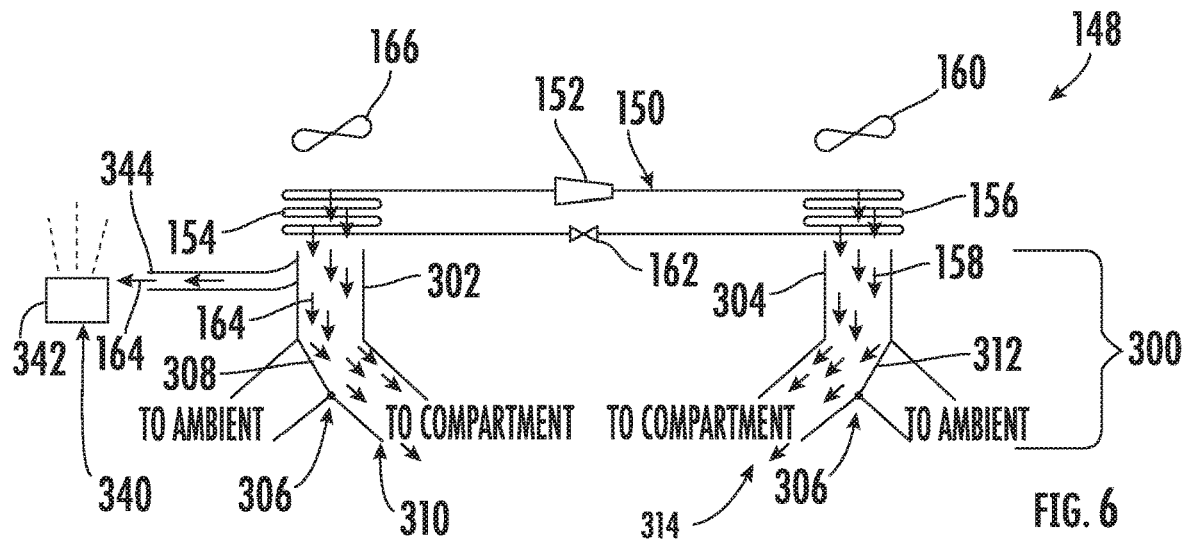
FIG. 6 provides a schematic view of the exemplary environmental control system of FIG. 4, operating in a cooling and heating mode.

Specifically, FIG. 3 illustrates sealed system 150 within mechanical compartment 140 and FIGS. 4 through 6 illustrated sealed system 150 in various modes of operation. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air 158). In this manner, the refrigerant condenses into a saturated liquid and/or liquid vapor mixture. A condenser fan 160 is positioned adjacent condenser 156 and may facilitate or urge the flow of heated air 158 across the coils of condenser 156 (e.g., from ambient atmosphere) in order to facilitate heat transfer.

According to the illustrated embodiment, an expansion device or a variable electronic expansion valve 162 may be further provided to regulate refrigerant expansion. During use, variable electronic expansion valve 162 may generally expand the refrigerant, lowering the pressure and temperature thereof. In this regard, refrigerant may exit condenser 156 in the form of high liquid quality/saturated liquid vapor mixture and travel through variable electronic expansion valve 162 before flowing through evaporator 154. Variable electronic expansion valve 162 is generally configured to be adjustable, e.g., such that the flow of refrigerant (e.g., volumetric flow rate in milliliters per second) through variable electronic expansion valve 162 may be selectively varied or adjusted.

Evaporator 154 is disposed downstream of variable electronic expansion valve 162 and is operable to heat refrigerant within evaporator 154, e.g., by absorbing thermal energy from air surrounding the evaporator (e.g., to create a flow of cooled air 164). For example, the liquid or liquid vapor mixture refrigerant from variable electronic expansion valve 162 may enter evaporator 154. Within evaporator 154, the refrigerant from variable electronic expansion valve 162 receives energy from the flow of cooled air 164 and vaporizes into superheated vapor and/or high quality vapor mixture. An air handler or evaporator fan 166 is positioned adjacent evaporator 154 and may facilitate or urge the flow of cooled air 164 across evaporator 154 in order to facilitate heat transfer. From evaporator 154, refrigerant may return to compressor 152 and the vapor-compression cycle may continue.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1-3 and 7-14, gardening appliance 100 generally includes a rotatable carousel, referred to herein as a grow module 200 that is mounted within liner 120, e.g., such that it is within temperature controlled chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210. Referring specifically to a first embodiment of grow module 200 illustrated in FIGS. 1 through 12, grow module 200 includes three partitions 206 to define a first chamber 212, a second chamber 214, and a third chamber 216, which are circumferentially spaced relative to each other. In general, as grow module 200 is rotated within temperature controlled chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

According to still other embodiments, grow module 200 may include one or more sealing elements 224 positioned on a radially distal end of each of partitions 206. In this regard, sealing elements 224 may extend from partitions 206 toward liner 120 to contact and seal against liner 120. For example, according to the illustrated embodiment, sealing elements 224 are wiper blades formed from silicone or another suitably resilient material. Thus, as grow module 200 rotates, sealing elements 224 slide against liner 120 to substantially seal each of the plurality of chambers 210. It should be appreciated that as used herein, the term "substantial seal" and the like is not intended to refer to a perfectly airtight junction. Instead, this term is generally used to refer to an environment which may be regulated independently of adjacent environments to a reasonable degree. For example, if plants 124 and the first chamber 212 prefer a 10° F. increase in temperature relative to plants 124 and second chamber 214, the substantial seal between these two chambers may facilitate such temperature difference.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 7:
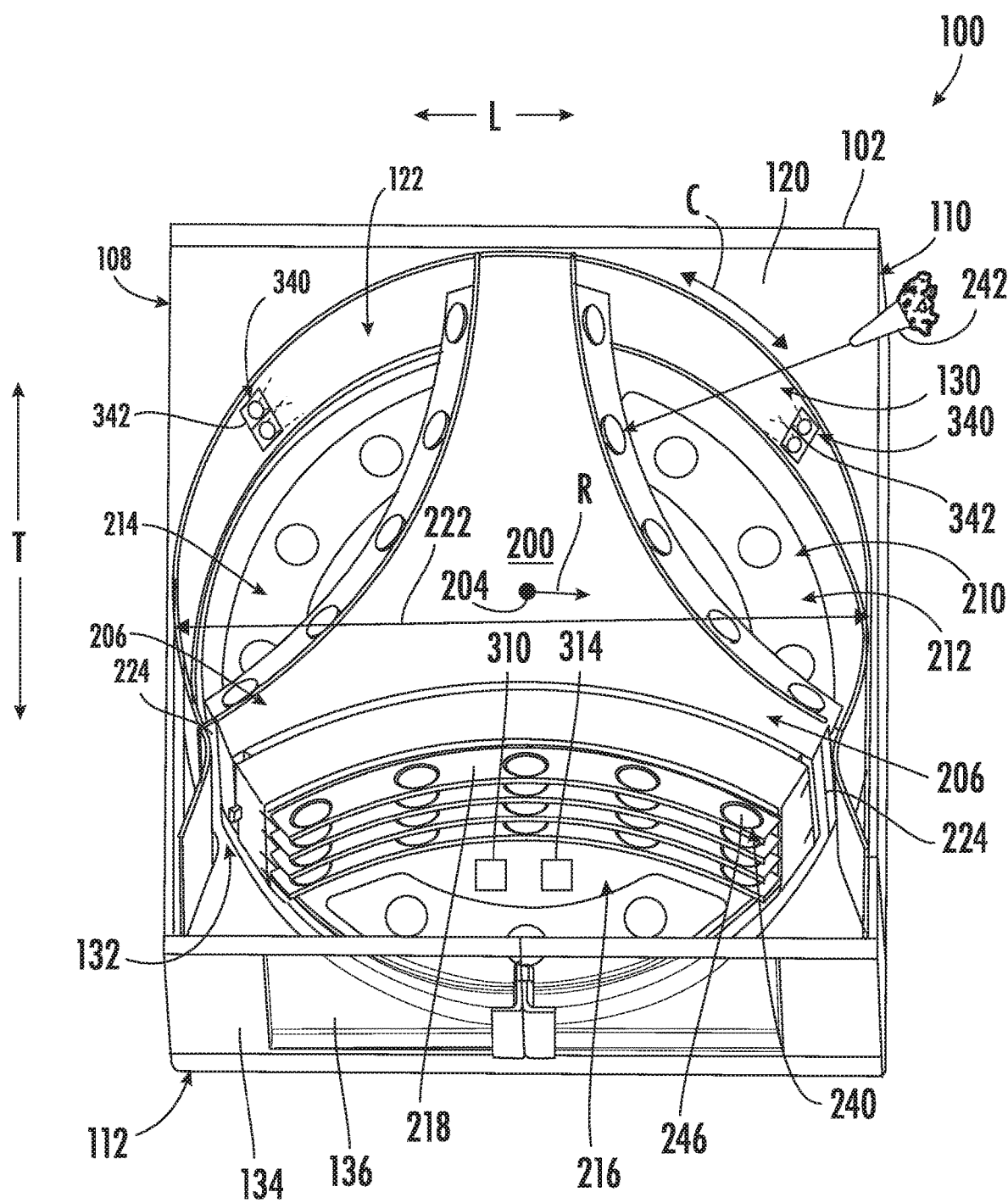
FIG. 7 is a top perspective view of the exemplary gardening appliance of FIG. 1, with the top panel of the cabinet removed to reveal a rotatable grow module according to an exemplary embodiment of the present subject matter.
Figure 8:
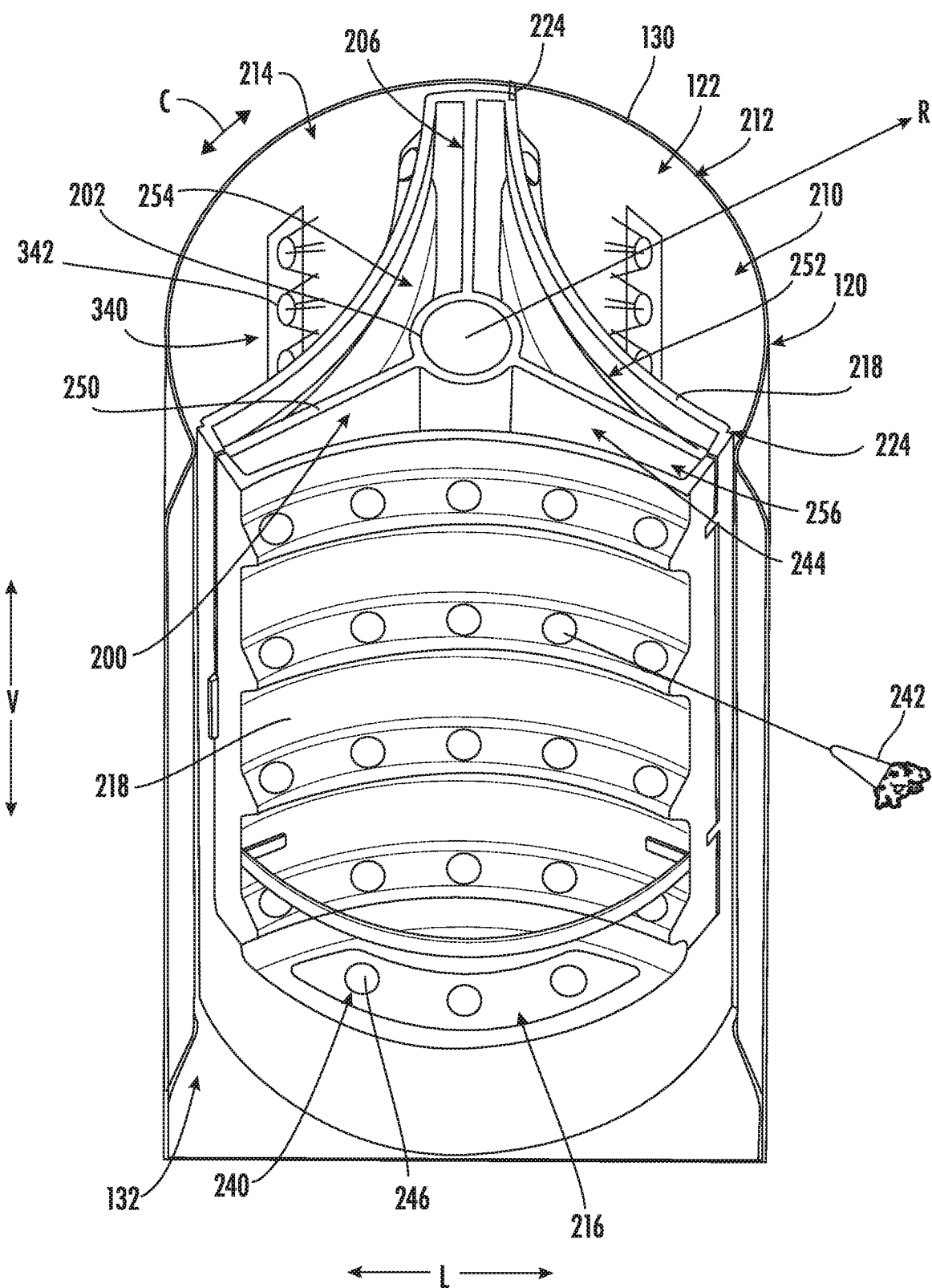
FIG. 8 provides a perspective cross sectional view of the exemplary gardening appliance of FIG. 1 according to another exemplary embodiment of the present subject matter.
Figure 9:
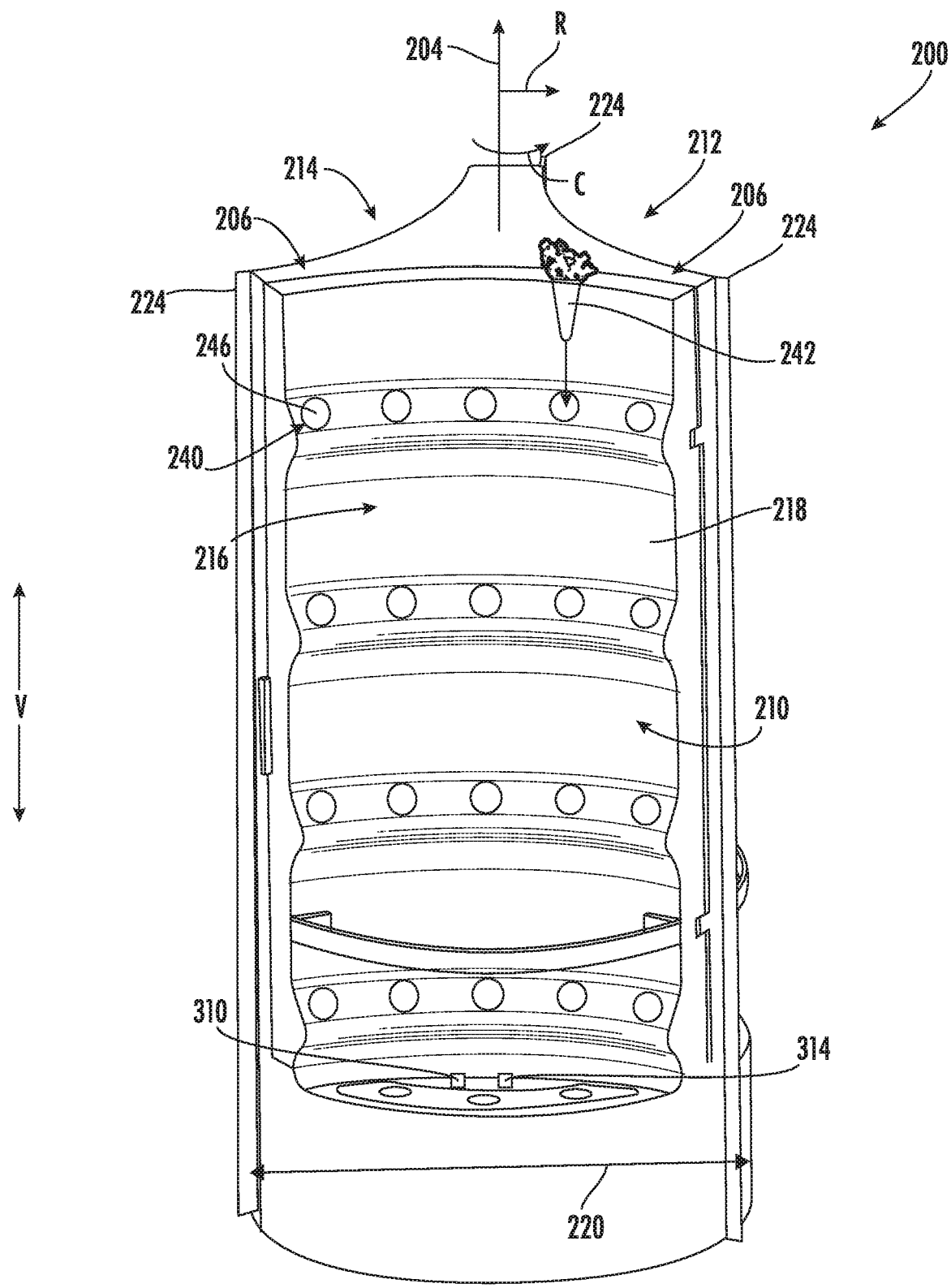
FIG. 9 provides a perspective view of the grow module of the exemplary gardening appliance of FIG. 1 according to another exemplary embodiment of the present subject matter.

For example, as illustrated in FIGS. 7 and 8, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 7 through 12, grow module 200 will be described in more detail according to an exemplary embodiment of the present subject matter. As shown, grow module 200 defines a plurality of cavities 240 which are generally configured for receiving plant pods 242. Plant pods 242 generally contain seedlings or other material for growing plants positioned within a mesh or other support structure through which roots of plants 124 may grow within grow module 200. A user may insert a portions of plant pod 242 (e.g., the root or seed end) having the desired seeds through one of the plurality of cavities 240 into a root chamber 244. In this regard, grow module 200 defines root chamber 244, e.g., within at least one of central hub 202 and the plurality of partitions 206. As will be explained below, water and other nutrients may be supplied to the root end of plant pods 242 within root chamber 244. Notably, cavities 240 may be covered by a flat flapper seal 246 to prevent water from escaping root chamber 244 when no plant pod 242 is installed.

Figure 10:
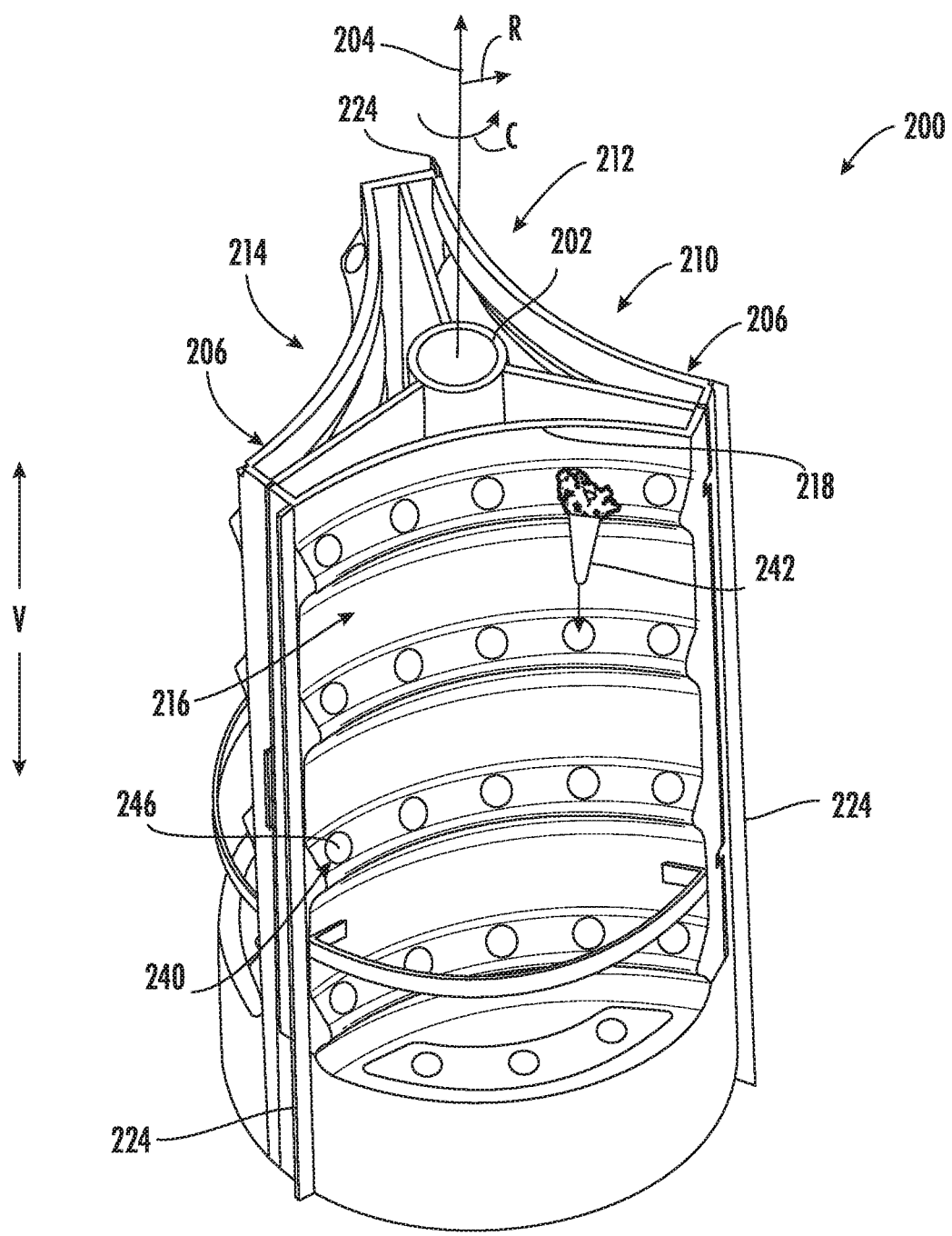
FIG. 10 provides a perspective cross sectional view of the exemplary grow module of FIG. 9 according to another exemplary embodiment of the present subject matter.
Figure 11:
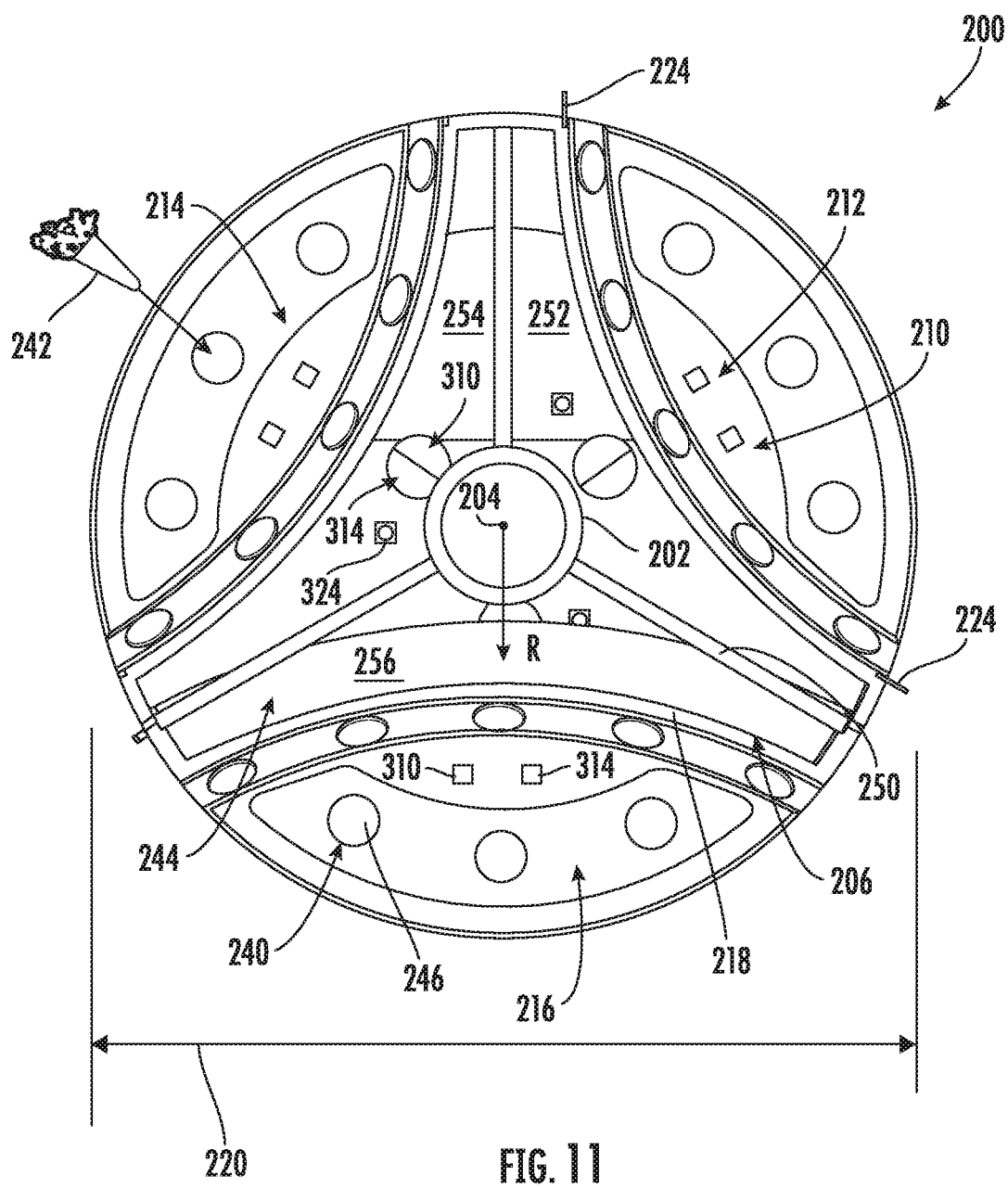
FIG. 11 provides a top cross sectional view of the exemplary grow module of FIG. 9 according to another exemplary embodiment of the present subject matter.
Figure 12:
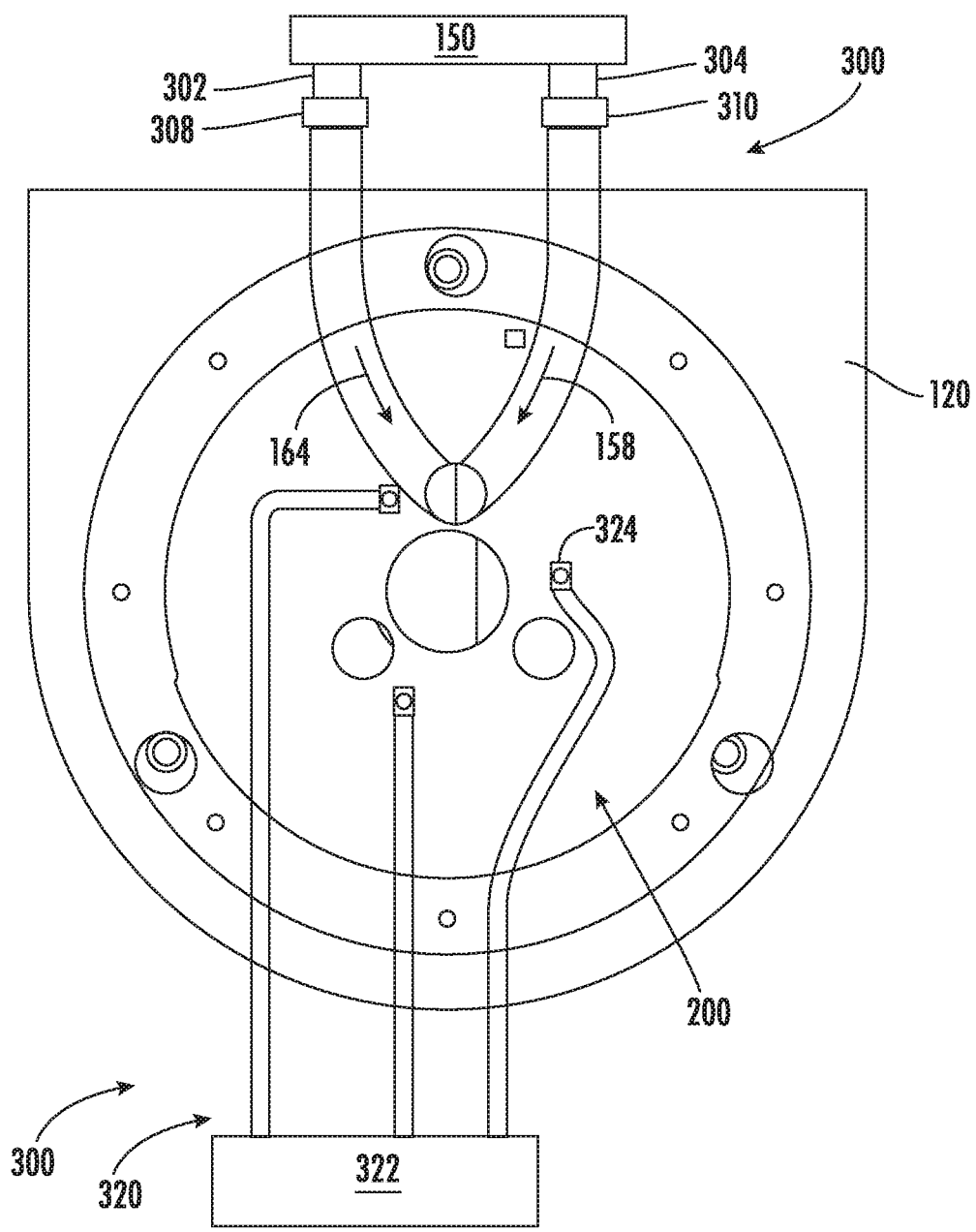
FIG. 12 provides a bottom view of the exemplary grow module of FIG. 9 according to another exemplary embodiment of the present subject matter.

As best shown in FIGS. 8 and 10, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of cavities 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality every chambers 252-256 independently of each other.

As explained above, environmental control system 148 includes a sealed system 150 for providing a flow of heated air 158 or a flow cooled air 164 throughout temperature controlled chamber 122 as needed. More specifically, environmental control system 148 includes a duct system 300 for directing the flows of heating or cooling air 158, 164. In this regard, a simplified duct system 300 is illustrated in FIGS. 4 through 6 to explain general functioning of such a system. In this regard, evaporator fan 166 generates a flow of cooled air 164 as the air passes over evaporator 154. Similarly, a condenser fan 160 generates a flow of heated air 158 as the air passes over condenser 156. These flows of air are routed through a cooled air supply duct 302 and a heated air supply duct 304, respectively.

Duct system 300 may further include a plurality of diverter assemblies 306 for regulating the flow of air throughout duct system 300. According to exemplary embodiments, diverter assemblies 306 are illustrated as pivoting dampers. However it should be appreciated that according to alternative embodiments, any suitable flow regulating device may be used. As shown in the simplified duct system 300 of FIGS. 4 through 6, duct system 300 includes two dampers for regulating the flows of heated and cooled air 158, 164, respectively.

More specifically, in FIG. 4, environmental control system 148 is operating in a cooling mode, such that a cool air damper 308 directs the flow of cooled air 164 to a cool air inlet (indicated generally by reference numeral 310) of temperature controlled chamber 122 while a hot air damper 312 directs the flow of heated air 158 outside to ambient environment. By contrast, FIG. 5 illustrates environmental control system 148 operating in a heating mode, such that cool air damper 308 directs the flow of cooled air 164 to ambient while hot air damper 312 directs the flow of heated air 158 into temperature controlled chamber 122 through a hot air inlet (indicated generally by reference numeral 314). Finally, FIG. 6 illustrates environmental control system 148 operating in both a heating and cooling mode. In this regard, cool air damper 308 directs the flow of cooled air 164 to a first compartment (e.g., compartment A) while hot air damper 312 directs the flow of heated air 158 to and a second compartment (e.g., compartment B). It should be appreciated that duct system 300 may vary in complexity and may regulate the flows of air from sealed system 150 in any suitable arrangement through any suitable grow chamber 210 or root chamber 244.

Environmental control system 148 may further include a hydration system 320 which is generally configured for providing water to plants 124 to support their growth. Specifically, according to the illustrated embodiment, hydration system 320 generally includes a water supply 322 and misting device 324 (e.g., such as a fine mist spray nozzle or nozzles). For example, water supply 322 may be a reservoir containing water (e.g. distilled water) or may be a direct connection municipal water supply. Misting device 324 may be positioned at a bottom of root chamber 244 and may be configured for charging root chamber 244 with mist for hydrating the roots of plants 124. Alternatively, misting devices 324 may pass through central hub 204 along the vertical direction V and periodically include a nozzle for spraying a mist or water into root chamber 244. Because various plants 124 may require different amounts of water for desired growth, hydration system 320 may alternatively include a plurality of misting devices 324, e.g., all coupled to water supply 322, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 7 and 8, gardening appliance 100 may further include a light assembly 340 which is generally configured for providing light into selected grow chambers 210 to facilitate photosynthesis and growth of plants 124. As shown, light assembly 340 may include a plurality of light sources 342 stacked in an array, e.g., extending along the vertical direction V. For example, light sources 342 may be mounted directly to liner 120 within temperature controlled chamber 122, or may alternatively be positioned behind liner 120 such that light is projected through a transparent window or light pipe into temperature controlled chamber 122. The position, configuration, and type of light sources 342 described herein are not intended to limit the scope of the present subject matter in any manner.

Light sources 342 may be provided as any suitable number, type, position, and configuration of electrical light source(s), using any suitable light technology and illuminating in any suitable color. For example, according to the illustrated embodiment, light source 342 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 342 may include any other suitable traditional light bulbs or sources, such as halogen bulbs, fluorescent bulbs, incandescent bulbs, glow bars, a fiber light source, etc.

As explained above, light generated from light assembly 340 may result in light pollution within a room where gardening appliance 100 is located. Therefore, aspects of the present subject matter are directed to features for reducing light pollution, or to the blocking of light from light sources 342 through front display opening 132. Specifically, as illustrated, light assembly 340 is positioned only within the enclosed back portion 130 of liner 120 such that only grow chambers 210 which are in a sealed position are exposed to light from light sources 342. Specifically, grow module 200 acts as a physical partition between light assemblies 340 and front display opening 132. In this manner, as illustrated in FIG. 8, no light may pass from first chamber 212 or second chamber 214 through grow module 200 and out front display opening 132. As grow module 200 rotates, two of the three grow chambers 210 will receive light from light assembly 340 at a time. According still other embodiments, a single light assembly may be used to reduce costs, whereby only a single grow chamber 210 will be lit at a single time.

Notably, the lifetime of light assembly 340 may be extended by maintaining a desirable temperature within and around light sources 342. Thus, according to an exemplary embodiment, sealed system 150 may be configured for providing a flow of cooled air 164 directly to a chamber housing light sources 342. In this regard, for example as illustrated schematically in FIGS. 4 through 6, a cooling bleed line 344 may be coupled to cooled air supply duct 302 for bleeding off a small portion of the flow of cooled air 164. Cooling bleed line 344 may be directly coupled to a chamber containing light assembly 340 or may blow over top of light assembly 340 for maintaining light assembly 340 at the desired temperature. It should be appreciated that according to alternative embodiments, other cooling configurations may be used.

Gardening appliance 100 and grow module 200 have been described above to explain an exemplary embodiment of the present subject matter. However, it should be appreciated that variations and modifications may be made while remaining within the scope of the present subject matter. For example, referring now to FIG. 13, an alternative embodiment of gardening appliance 100, identified herein as gardening appliance 360 will be described according to an exemplary embodiment. Notably, due to the similarity with the prior disclosed embodiment, similar reference numerals will be used to refer to the same or similar features between the embodiments.

Figure 13:
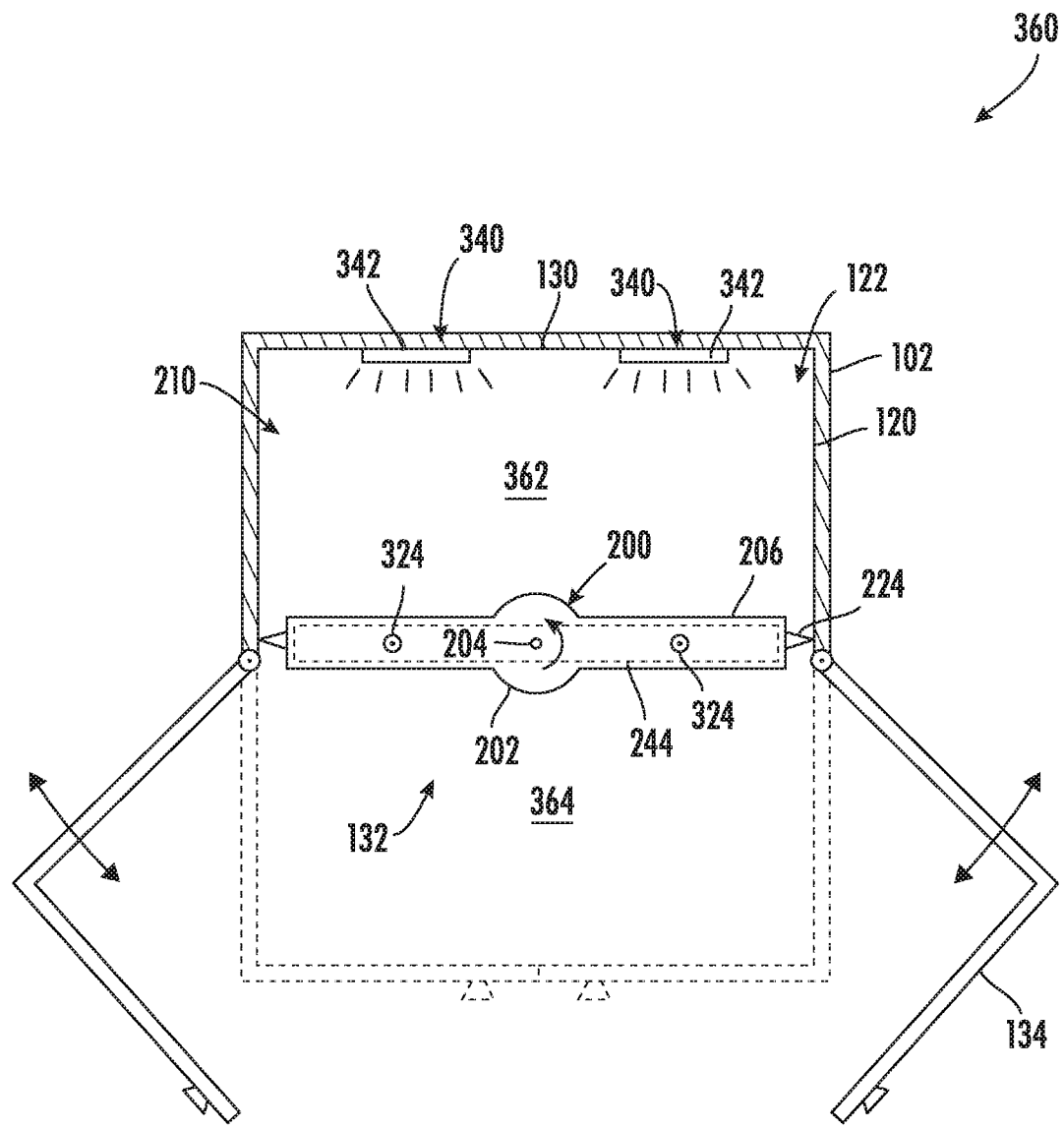
FIG. 13 provides a top schematic view of a gardening appliance according to another exemplary embodiment of the present subject matter.

As illustrated, gardening appliance 360 is a simplified to a two-chamber embodiment with a square liner 120. In this regard, grow module 200 includes two partitions 206 extending from opposite sides of central hub 202 to define a first grow chamber 362 and a second grow chamber 364. By rotating grow module 200 by 180 degrees about central axis 206, first chamber 362 may alternate between the sealed position (e.g., as illustrated in FIG. 13) and the display position (not shown). By contrast, the same rotation will move second chamber 364 from the display position (e.g., as illustrated in FIG. 13) to the sealed position (not shown). Similar to prior embodiments, gardening appliance 360 as illustrated in this figure may include an environmental control system 148 for regulating the temperature, humidity, and lighting level within the chamber in the sealed position.

Referring now to FIG. 14, still another exemplary embodiment of gardening appliance 100, identified herein as gardening appliance 370 will be described according to an exemplary embodiment. Gardening appliance 370 also includes a three chamber grow module 200, but has a modified cabinet 102 such that front display opening 132 is wider and two of the three grow chambers 210 are displayed at a single time. Thus, continuing with the same reference numbers for convenience, first chamber 212 is illustrated in the sealed position, while second chamber 214 and third chamber 216 are illustrated in the display positions. As grow module 200 is rotated counterclockwise, first chamber 212 is moved into the display position and third chamber 216 is moved into the sealed position. According to such an embodiment, light assembly 340 as well as any inlets 310, 314 from duct system 300 are positioned proximate a rear side 114 of cabinet 102 such that all lighting, temperature, and humidity control are done within the rear or back portion of the chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A gardening appliance defining a vertical direction, the gardening appliance comprising:
   a liner positioned within a cabinet, the liner defining a front display opening;
   a grow module mounted within the liner, the grow module defining a plurality of grow chambers spaced apart along a circumferential direction, the grow module being rotatable to index each of the plurality of grow chambers through a sealed position and a display position, wherein a chamber of the plurality of chambers is in the sealed position when substantially sealed between the grow module and the liner and in the display position when aligned with the front display opening; and
   an environmental control system for regulating a temperature within the chamber when the chamber is in the sealed position, wherein the environmental control system comprises:
      a sealed system for generating a flow of air at a desired temperature, the sealed system comprising an evaporator, an evaporator fan for urging a flow of cooled air through the evaporator and into a cooling duct, a condenser, and a condenser fan for urging a flow of heated air through the condenser and into a heating duct; and
      a duct system for directing the flow of air into the chamber in the sealed position.
2. The gardening appliance of claim 1, wherein the grow module comprises:
   a central hub rotatable about an axis and a plurality of partitions extending from the central hub substantially along a radial direction.
3. The gardening appliance of claim 2, wherein the grow module defines a root chamber within at least one of the central hub or the plurality of partitions.
4. The gardening appliance of claim 3, wherein the environmental control system is configured for regulating a temperature of the root chamber to a desired root temperature.
5. The gardening appliance of claim 3, wherein the grow module comprises:
   an internal divider that splits the root chamber into a plurality of root chambers, wherein the environmental control system regulates a temperature of each of the plurality of root chambers independently.
6. The gardening appliance of claim 3, wherein the environmental control system further comprises:
   a hydration system for providing water to the root chamber.
7. The gardening appliance of claim 6, wherein the hydration system selectively charges the root chamber with mist.
8. The gardening appliance of claim 1, wherein the plurality of partitions comprises two partitions extending from opposite sides of the central hub to define a first grow chamber and a second grow chamber, the first grow chamber and the second grow chamber alternating between the sealed position and the display position as the grow module rotates.
9. The gardening appliance of claim 1, wherein the plurality of partitions comprises three partitions defining a first grow chamber, a second grow chamber, and a third grow chamber spaced apart from each other along a circumferential direction.
10. The gardening appliance of claim 1, wherein the duct system comprises:
    a cooled air supply duct;
    a cool supply damper operably coupled to the cooled air supply duct for regulating a flow of cooled air;
    a heated air supply duct; and
    a hot supply damper operably coupled to the heated air supply duct for regulating a flow of heated air.

11. The gardening appliance of claim 1, further comprising:
a light assembly mounted to the liner for illuminating the chamber in the sealed position.

12. The gardening appliance of claim 11, further comprises a light cooling duct providing a flow of cooled air from the sealed system to the light assembly.

13. The gardening appliance of claim 1, further comprising:
a motor mechanically coupled to the grow module for selectively rotating the grow module.

14. The gardening appliance of claim 1, wherein the liner defines an enclosed back portion that is substantially cylindrical, the enclosed back portion defining a liner diameter substantially equal to a grow module diameter.

15. The gardening appliance of claim 1, further comprising:
a resilient seal positioned on a distal end of each of the plurality of partitions and extending toward the liner substantially along the radial direction.

16. The gardening appliance of claim 1, further comprising:
a door pivotally mounted to the cabinet to provide selective access to the front display opening, the door being at least partially transparent.

17. A gardening appliance defining a vertical direction, the gardening appliance comprising:
a liner positioned within a cabinet, the liner defining a front display opening;
a grow module mounted within the liner, the grow module comprising a central hub rotatable about an axis and a plurality of partitions extending from the central hub substantially along a radial direction to define a plurality of grow chambers, wherein the grow module further defines a root chamber within at least one of the central hub or the plurality of partitions;
an internal divider that splits the root chamber into a plurality of root chambers; and
an environmental control system for regulating a temperature within at least one of the plurality of grow chambers or the plurality of root chambers.

18. The gardening appliance of claim 17, further comprising:
a motor mechanically coupled to the grow module for selectively rotating the grow module to index each of the plurality of grow chambers through a sealed position and a display position, wherein a chamber of the plurality of chambers is in the sealed position when substantially sealed between the grow module and the liner and in the display position when aligned with the front display opening.

19. A gardening appliance defining a vertical direction, the gardening appliance comprising:
a liner positioned within a cabinet, the liner defining a front display opening;
a grow module mounted within the liner, the grow module defining a plurality of grow chambers spaced apart along a circumferential direction, the grow module being rotatable to index each of the plurality of grow chambers through a sealed position and a display position, wherein a chamber of the plurality of chambers is in the sealed position when substantially sealed between the grow module and the liner and in the display position when aligned with the front display opening;
an environmental control system for regulating a temperature within the chamber when the chamber is in the sealed position;
a light assembly mounted to the liner for illuminating the chamber in the sealed position; and
a light cooling duct providing a flow of cooled air from the sealed system to the light assembly.

20. The gardening appliance of claim 19, wherein the environmental control system comprises:
a sealed system for generating a flow of air at a desired temperature, the sealed system comprising an evaporator, an evaporator fan for urging a flow of cooled air through the evaporator and into a cooling duct, a condenser, and a condenser fan for urging a flow of heated air through the condenser and into a heating duct; and
a duct system for directing the flow of air into the chamber in the sealed position.

* * * * *